Nov. 15, 1955 P. H. PELLEY 2,723,426
MANUFACTURE OF REINFORCED PLASTIC TUBING
Filed Feb. 12, 1953
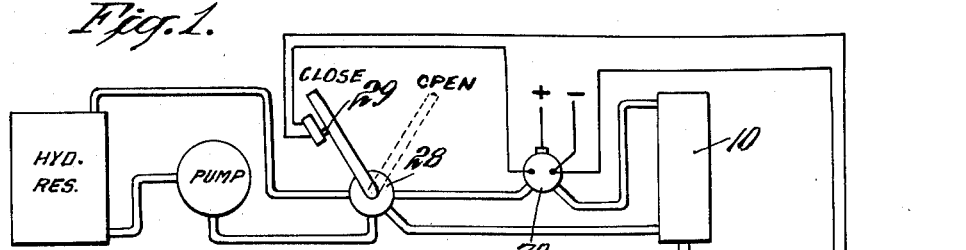
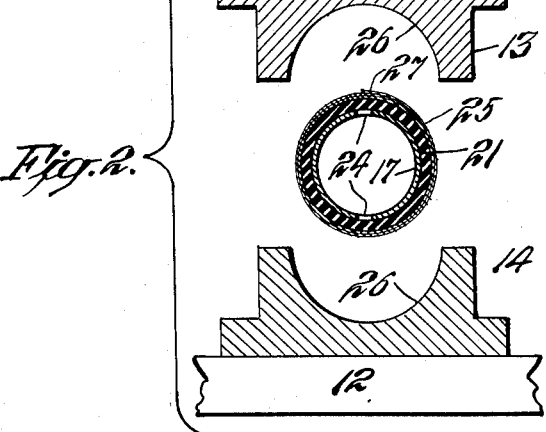
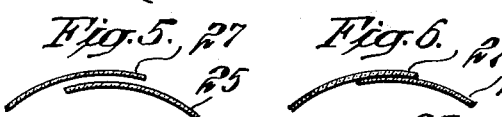
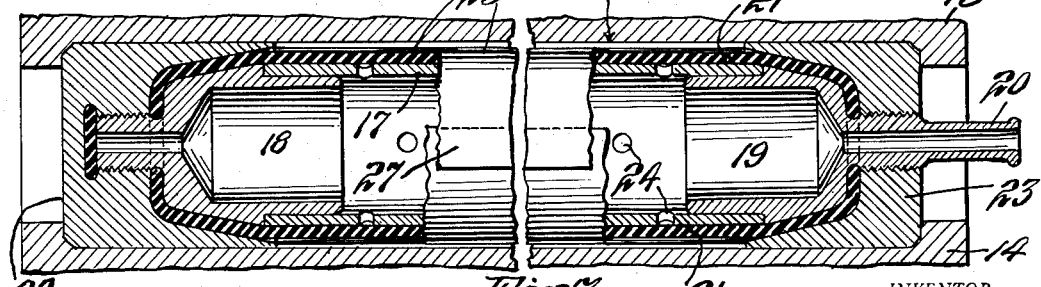
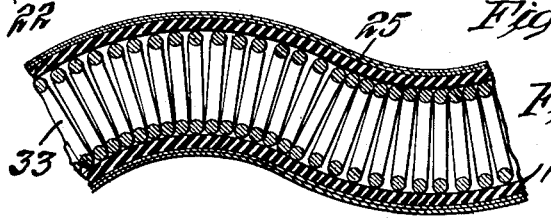
INVENTOR.
PERRY H. PELLEY
BY
ATTORNEY

United States Patent Office 2,723,426
Patented Nov. 15, 1955

2,723,426

MANUFACTURE OF REINFORCED PLASTIC TUBING

Perry H. Pelley, Wichita, Kans., assignor to Beech Aircraft Corporation, Wichita, Kans., a corporation of Delaware Application February 12, 1953, Serial No. 336,528

1 Claim. (Cl. 18—35)

The invention herein disclosed relates to the manufacture of tubing and articles of tubular form from reinforced sheet plastic.

A special purpose of the invention is to produce a high quality thin walled tubing of substantially uniform wall thickness, internal and external dimensions and other characteristics.

Particular objects of the invention are to provide simple, practical method and apparatus for efficient production of such tubular articles.

Important objects of the invention are to enable production of tubular articles in various forms and shapes. Thus in addition to straight cylindrical tubing, to be able to produce tapered, variously curved tubing and tubing in different cross sectional shapes.

Other objects attained by the invention and the novel features of construction, combination and relation of parts and steps of manufacture are set forth and will appear in the course of the following specification.

The drawing accompanying and forming part of the specification illustrates apparatus presently employed in the practice of the invention but changes and modifications may be resorted to without departure from the true spirit and broad scope of the invention as hereinafter defined and claimed.

Fig. 1 in the drawing is a diagrammatic view illustrative of the complete system involving the separable mold, the mold closing press and the expansible mandrel about which the sheet material to form the tubing is wrapped;

Fig. 2 is an enlarged broken sectional detail illustrating the placing of the mandrel with the plastic wrapped about it within the opened mold, the mandrel at such time being in the collapsed condition;

Fig. 3 is a generally similar view showing the mold closed and the mandrel expanded to expand the wrapped sheet material against the confining mold wall;

Fig. 4 is a like view with the mold still closed but the mandrel collapsed and released from the forming tubing;

Figs. 5 and 6 are enlarged cross sectional details showing how the lap joint of the sheet material slips under expanding pressure of the mandrel to permit enlargement without bursting the material;

Fig. 7 is a broken longitudinal sectional view illustrating a form of mandrel for straight tubing;

Fig. 8 is a broken longitudinal sectional detail of a flexible curvilinear form of expansible mondrel.

In the diagrammatic view, Fig. 1, a hydraulic press is represented at 10 having movable platen and bed members 11, 12, carrying the companion upper and lower elements 13, 14, of a separable mold having the configuration of the external form of the tubular article to be produced, in the illustration the plain, straight, thin walled cylindrical tubing 15.

The expansible mandrel or mold core indicated at 16 may be constructed as shown in Fig. 7, with an inner metal tube 17 closed by end caps 18, 19, the latter having an air inlet at 20 and all surrounded by a silicone rubber tube 21 held at the ends by enclosing caps 22, 23.

The inner, rigid tube 17 is shown as having perforations 24 to pass the expanding fluid, usually compressed air, to the surrounding rubber tube.

The mandrel in the collapsed condition is enough smaller to freely go into the mold or die chamber with the tube forming material wrapped about the same.

This is shown in Fig. 7, where 25 designates the plastic sheet wrapped about the collapsed rubber tube, this view showing space between the mandrel and the surrounding mold wall 26.

To permit the wrapped sheet material to expand under pressure of the expanding mandrel tube, this material may be rolled spirally about the mandrel with slightly more overlap 27 at the end than required, and which will slip under internal pressure but still leave sufficient material for an overlap seam as strong as the rest of the tubing.

By way simply of example, 2½" tubing has been made with impregnated material such as polyester of phenolic resin impregnated glass cloth wrapped spirally in four layers with approximately ¾" overlap, which reduced to approximately ½" lap in the expanded, finished product.

In preparing and rolling the plastic about the collapsed mandrel, a suitable adhesive for the plastic used is applied to the sheet, particularly at the seam forming end.

The press may be hydraulic, steam, pneumatic or other type to afford quick opening and closing of the mold and application of heat for curing the plastic in the mold chamber. For these reasons a heated platen press may be used.

Controls are preferably employed to insure that the mandrel will not be expanded until the press is closed, and to insure that pressure will be released from the mandrel before the press is opened.

In the illustration a control valve 28 is shifted from the dotted line open position to the full line closed position, to effect closure of the mold and this effects operation of a switch 29 to actuate pressure switch 30 and solenoid valve 31 in the air line 32 supplying pressure to the expansible core.

As a safety measure and to effect a short molding cycle, the air pressure used to expand the mandrel is automatically controlled by the pressure in the press cylinder. When the press is closed and the pressure in the press reaches a proper high value, the pressure switch 30 acts to energize solenoid valve 31 and admit pressure to expand the mandrel.

This pressure forces the impregnated material against the heated wall of the mold, as shown in Fig. 3, where it cures. After curing the internal pressure is released and the silicone rubber bag or tube 21 shrinks or collapses as shown in Fig. 4, so that when the mold is opened and the mandrel removed, the finished tube may be freely removed from the mandrel.

The silicone rubber tube affords a firm support for the sheet plastic and expands uniformly to form a plastic tube of substantially uniform characteristics, wall thickness, etc.

The overstanding end caps 22, 23, firmly retain the silicone rubber tube in place and prevent injury from repeated expansion and contraction.

The silicone rubber is extremely heat resistant, does not inhibit cure of the resin being used, it parts readily from the cured resin and is not attacked by the uncured resin.

In place of a rigid inner tube such as shown at 17 in Fig. 7, the expansible mandrel may have a flexible inner element such as a helically coiled spring 33, Fig. 8, which after the plastic sheet 25 is applied, may bend in various ways to enable the mandrel with its plastic wrapping, to be placed in a mold having the curvature or curvatures to be imparted to the tubing.

It will be appreciated, further, that the expansible mandrel may be tapered or otherwise shaped in longitudinal extent and be oval, angular or other cross sectional shape, in each instance to fit in a mold of corresponding shape.

The inner member of the mandrel, whether it be rigid or flexible, provides a form for supporting the silicone rubber tube in a definite and more or less fixed shape while the plastic sheet is being wrapped and secured thereon.

The protective end caps 22, 23, of the mandrel fit closely in the mold so that the mandrel is firmly secured and held in definite position but the silicone rubber tube left free for its expanding and contracting movements.

The solenoid valve 31 is indicated as constructed with a vent 34 which will automatically open to release pressure from the mandrel when the control handle is thrown to the open position indicated in the broken lines, Fig. 1.

With the flexible type mandrel shown in Fig. 8, the sheet plastic may be wound about the mandrel while the latter is in straight or substantially straight condition, and then the mandrel with the applied wrapping be bent and manipulated to fit it to the particular curvature of the mold. This method and arrangement avoids creasing or wrinkling the applied plastic sheet.

The silicone rubber tube forming the shell of the mandrel expends uniformly, enabling production of tubing or other tubular articles of substantially uniform characteristics in any desired lengths. While particularly practical for making thin wall tubing, it will be realized that thicker wall tubing may be produced in the same apparatus with appropriate changes in the mold and mandrel structure.

What is claimed is:

Apparatus for the manufacture of plastic tubing comprising a mandrel having a rigid central hollow form and a tube of expansible material closely fitting said form and thereby providing a firm support for a sheet of plastic to be wrapped about the same, said tube being expansible away from the hollow form and the latter having openings to admit expanding fluid to the surrounding tube and having an opening at one end for admission and exhaust of a fluid for expanding the tube, a separable mold having a mold chamber to receive said mandrel and larger than the tube with the wrapped material applied thereto, to permit expansion of the tube to force the applied wrapping against the surrounding mold walls and means for heating the mold to effect curing of the expanded plastic material wrapped about the tube, end caps closing the ends of said rigid central hollow form, the opening for admission and exhaust of expanding fluid extending through one of said end caps, the ends of the expansible tube being extended over said end caps and external caps engaged over the extended end portions of said expansible tube and thereby mechanically securing the ends of said tube, said external end caps being of larger diameter than the collapsed expansible tube and of a size to fit the separable mold when said mold is closed and whereby said mandrel is positively located and held in the closed mold apart from the expansion of the tube.

References Cited in the file of this patent

UNITED STATES PATENTS

| | | |
|---|---|---|
| 1,387,066 | Murray | Aug. 9, 1921 |
| 1,592,536 | O'Neill | July 13, 1926 |
| 1,676,325 | Doll | July 10, 1928 |
| 2,528,643 | Dubbs | Nov. 7, 1950 |
| 2,573,643 | Hurry | Oct. 30, 1951 |

FOREIGN PATENTS

| | | |
|---|---|---|
| 66,663 | Germany | Jan. 30, 1893 |
| 674,138 | Great Britain | June 18, 1952 |